(12) United States Patent
Tokito et al.

(10) Patent No.: US 10,539,195 B2
(45) Date of Patent: Jan. 21, 2020

(54) OIL SUPPLY STRUCTURE OF CLUTCH DEVICE

(71) Applicant: HONDA MOTOR CO., LTD., Tokyo (JP)

(72) Inventors: Akira Tokito, Wako (JP); Toshitaka Akita, Wako (JP); Yoichiro Takahashi, Wako (JP); Taichi Honda, Wako (JP); Hitoshi Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 223 days.

(21) Appl. No.: 15/850,442

(22) Filed: Dec. 21, 2017

(65) Prior Publication Data

US 2018/0180113 A1 Jun. 28, 2018

(30) Foreign Application Priority Data

Dec. 28, 2016 (JP) .................................. 2016-255289

(51) Int. Cl.
  *F16D 13/74* (2006.01)
  *F16D 23/12* (2006.01)
  *F16D 13/52* (2006.01)
  *F16D 13/72* (2006.01)

(52) U.S. Cl.
  CPC ............. *F16D 13/74* (2013.01); *F16D 13/52* (2013.01); *F16D 13/72* (2013.01); *F16D 23/12* (2013.01)

(58) Field of Classification Search
  CPC .......... F16D 13/74; F16D 13/72; F16D 13/52; F16D 23/12; F16D 13/56; F16D 2300/24; F16D 2023/123; F16H 57/0473; F16H 57/043; F16H 57/0427; F16H 57/04
  See application file for complete search history.

(56) References Cited

U.S. PATENT DOCUMENTS 6,401,896 B1 * 6/2002 Schnepf .................. F16D 13/74
                                        192/113.34
8,997,962 B2 * 4/2015 Yazaki .................... F16D 13/52
                                        192/70.12

FOREIGN PATENT DOCUMENTS

| JP | 2001-82504   | 3/2001 |
| JP | 2010-151270  | 7/2010 |
| JP | 2011-163425  | 8/2011 |
| JP | 2013-190053  | 9/2013 |

* cited by examiner

*Primary Examiner* — Jacob S. Scott
*Assistant Examiner* — Lillian T Nguyen
(74) *Attorney, Agent, or Firm* — Rankin, Hill & Clark LLP

(57) ABSTRACT

An engine clutch device includes first and second alternately stacked frictional power transmitting members and a clutch pressure member for axially bringing the frictional power transmitting members into pressure contact. The clutch device includes an oil supply portion adjacent to a distal end of power transmission shaft. The clutch device has an oil supply structure including a clutch lifter member with a flange portion axially facing the distal end of power transmission shaft, to axially shift the clutch pressure member to release the pressure contact of the frictional power transmitting members. The flange portion has a bowl-shaped portion extending axially to surround the one end portion of the power transmission shaft. The bowl-shaped portion including the flange portion functions to guide oil axially inward along the power transmission shaft and serves to provide an improved oil supply effect to the frictional power transmitting members.

7 Claims, 8 Drawing Sheets

OIL SUPPLY STRUCTURE OF CLUTCH DEVICE

TECHNICAL FIELD

The present invention relates to an oil supply structure of a multi-plate wet clutch device provided in a power unit including an internal combustion engine.

BACKGROUND ART

For example, Patent Document 1 below discloses an oil supply structure of a clutch device of a motorcycle engine. The clutch device includes a clutch inner member, a clutch outer member, a plurality of first and second frictional power transmitting members belonging to the clutch inner member and the clutch outer member, respectively, a clutch pressure member, and a clutch lifter member. The clutch inner member is disposed on one end portion of a power transmission shaft. The clutch outer member is disposed coaxially with the clutch inner member. The frictional power transmitting members are provided on the clutch inner member and the clutch outer member. The first and second frictional power transmitting members are alternately stacked between the clutch inner member and the clutch outer member. The clutch pressure member is disposed to axially face the clutch inner member. The clutch pressure member is operative to bring the frictional power transmitting members into pressure contact to connect the clutch device. The clutch lifter member includes a flange portion acting to axially shift the clutch pressure member in a direction to disconnect the clutch device. One end portion of the power transmission shaft has a distal end adjacent to an oil supply device or portion adjacent to the flange portion.

In the oil supply structure of the clutch device disclosed in Patent Document 1 below, the oil supply portion is provided adjacent to the distal end of the one end portion of the power transmission shaft. It is desired in such oil supply structure to improve oil supply performance to the frictional power transmitting members, aiming at a further sufficient oil supply to a far-side in the axial direction of the clutch device.

PRIOR ART DOCUMENT

Patent Document

[Patent Document 1] JP 5 503 320 B (FIGS. 1 to 3)

SUMMARY OF INVENTION

Technical Problem

The present invention has been made in consideration of the above-described prior art, and it is an object of the present invention to provide an oil supply structure of a clutch device that ensures guiding oil toward an axially far or inner side in the direction of the axial center line of the power transmission shaft, to enable a satisfactory oil supply to the frictional power transmitting members positioned on the axially inner side in the axial center line direction, thereby improving oil supply performance of the clutch device even when the oil supply portion is positioned adjacent to the distal end of the one end portion of the power transmission shaft.

Solution to Problem

In order to solve the above-described problem, the present invention provides an oil supply structure of a clutch device comprising: a clutch inner member provided on one end portion of a power transmission shaft; a clutch outer member provided coaxially with the clutch inner member; a plurality of first and second frictional power transmitting members supported on the clutch inner and outer members, respectively, and disposed between the clutch inner and outer members, the first and second frictional power transmitting members being alternately stacked between the clutch inner and outer members; a clutch pressure member disposed to oppose to the clutch inner member in an axial direction of the power transmission shaft, the clutch pressure member being operative to bring the first and second frictional power transmitting members into pressure contact; and an oil supply device provided adjacent to a distal end of the one end portion of the power transmission shaft to supply oil to the distal end of the one end portion: wherein the clutch device includes a clutch lifter member axially movable to axially urge the clutch pressure member so as to release the pressure contact between the first and second frictional power transmitting members, the clutch lifter member having a flange portion facing the one end portion of the power transmission shaft in the axial direction of the power transmission shaft; and the flange portion has a bowl-shaped portion formed to define a bowl shape extending axially to an open outer periphery thereof, in a manner to cover and surround the one end portion of the power transmission shaft.

The above-described configuration ensures guiding oil supplied inside the bowl-shaped portion axially inward along the axial center line of the power transmission shaft, by an oil guiding function of the bowl shape formed on the clutch lifter member, thereby to provide a satisfactory oil supply to the frictional power transmitting members positioned at axially inner or far side with respect to the axial center line of the power transmission shaft, whereby oil supply performance of the clutch device is improved.

In a preferred embodiment of the invention, the clutch inner member is fixed to the one end portion of the power transmission shaft by means of a nut member, and the bowl-shaped portion of the clutch lifter member extends axially inward in the direction of an axial center line of the power transmission shaft so as to cover and surround the nut member.

Such configuration ensures protection of the nut member and prevents a lock washer for fixing the nut member from loosening.

In a preferred embodiment of the invention, the bowl-shaped portion of the clutch lifter member includes a plurality of oil supply outlet holes communicating an inside and an outside of the bowl-shaped portion, the oil supply outlet holes being dispersed circumferentially and axially of the bowl-shaped portion.

Such configuration ensures achieving optimization of an oil supply amount and oil supply sites.

In a preferred embodiment of the invention, the bowl-shaped portion has on an inner surface thereof an upright weir-shaped separator extending in a circumferential direction of the bowl-shaped portion.

Such configuration enables the weir-shaped separator to dam up impurities, functioning as a centrifugal filter when the bowl-shaped portion rotates.

In a further preferred embodiment of the invention, the bowl-shaped portion has on an inner surface thereof a magnet fixed thereto.

Such configuration provides a filtering effect for oil by magnetic attraction of magnetic materials such as iron powder in the oil supplied inside the bowl-shaped portion.

In a still further preferred embodiment of the invention, the bowl-shaped portion has, on an inner surface thereof, an upright weir-shaped separator extending in a circumferential direction of the bowl-shaped portion, and a magnet fixed thereto, the magnet being disposed at a position nearer to a central portion of bowl-shaped portion than the weir-shaped separator.

Such configuration improves the effect of the weir-shaped separator damming up the impurities as the centrifugal filter, not only when the bowl-shaped portion is rotating but also when the bowl-shaped portion is stopped.

In a preferred embodiment of the invention, the clutch lifter member has a tubular portion coaxially fitted in an axial inner hole formed in the one end portion of the power transmission shaft; and the tubular portion of the clutch lifter member has therearound a plurality of oil passages for axially guiding oil supplied in the power transmission shaft to the oil supply device adjacent to the one end portion of the power transmission shaft and then to the inside of the bowl-shaped portion, the oil passages being in the form of grooves formed in an outer surface of the tubular portion and extending in the direction of an axial center line of the power transmission shaft.

Such configuration improves operability of the clutch lifter member by the oil passage grooves formed in the outer peripheral surface of the tubular portion, whereby productivity of the oil passage grooves is improved with a cost reduction.

Advantageous Effects of Invention

With the oil supply structure of the clutch device according to the present invention, the oil supplied inside the bowl-shaped portion is guided toward axially inner or far side with respect to the direction of the axial center line of the power transmission shaft, by the guidance of the inner surface of the bowl-shaped portion of the clutch lifter member, to provide a satisfactory oil supply to the frictional power transmitting members positioned in the axially inner or far side in the axial center line direction, whereby oil supply performance of the clutch device is improved.

DESCRIPTION OF EMBODIMENTS

Figure 1:
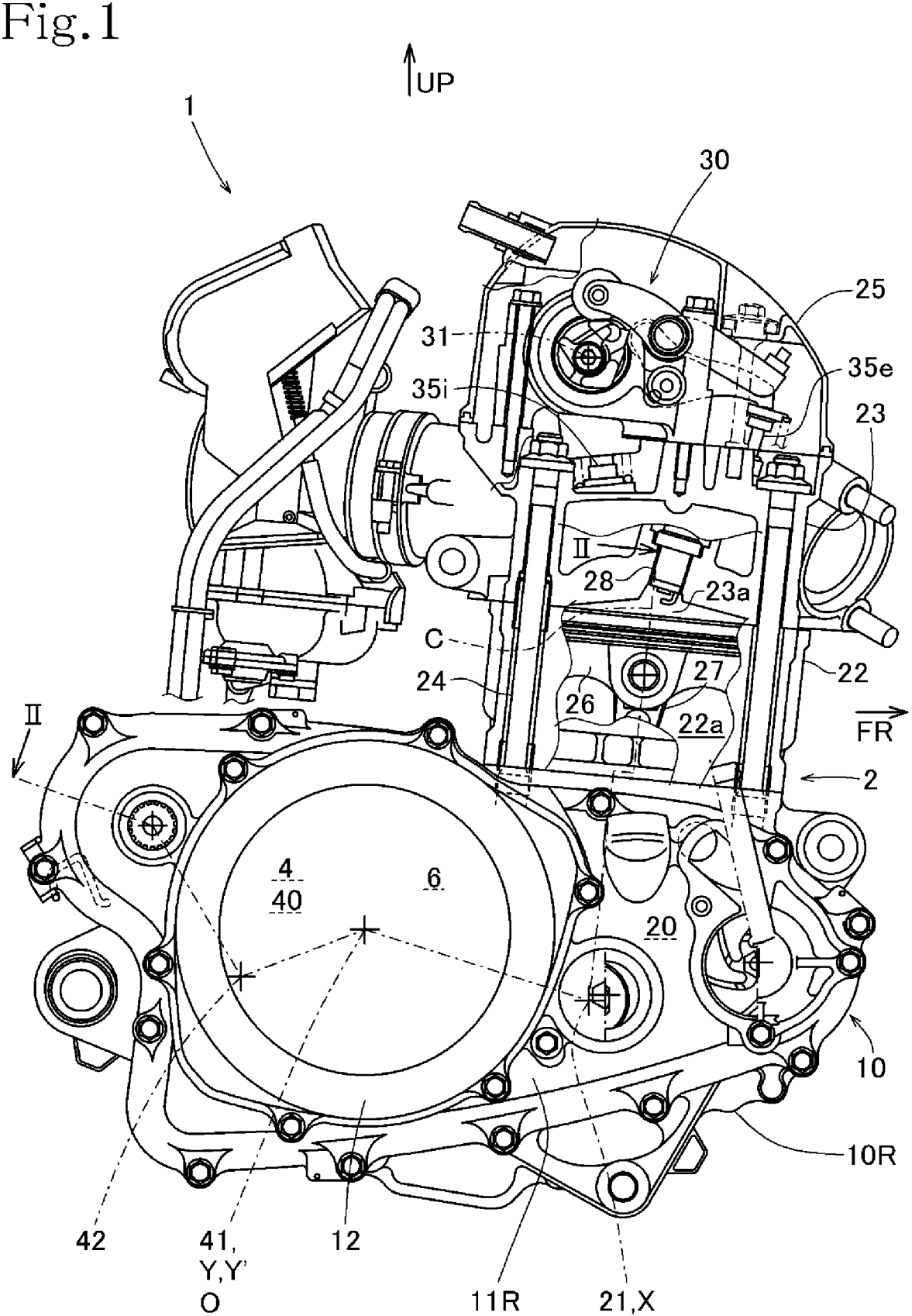
FIG. 1 is a right side view, in partial section, illustrating an engine power unit having an oil supply structure according to a first embodiment.

Embodiments of an oil supply structure of a clutch device of the present invention will be described with reference to the drawings.

It should be noted that directions, such as front, back, right, left, upper, and lower, in the following description of the specification are directions with regard to a vehicle on which a power unit including the oil supply structure of the clutch device according to the embodiments of the invention is mounted.

In the drawings, arrows FR, LH, RH, and UP indicate a front side of the vehicle, a left side of the vehicle, a right side of the vehicle, and an upper side of the vehicle, respectively.

It should be noted that small solid arrows in the drawings schematically show directions of oil flows in the embodiments of the present invention.

The clutch device used in each of the embodiments is a multiplate wet clutch device provided in a power unit including an internal combustion engine mounted on a vehicle, such as a motorcycle. However, the present invention does not limit the use of the vehicle and the power unit to which the clutch device is provided and does not exclude a stationary power unit not mounted on a vehicle. Further, type of the internal combustion engine that constitutes the power unit and number of cylinders of the engine are not limited.

Figure 2:
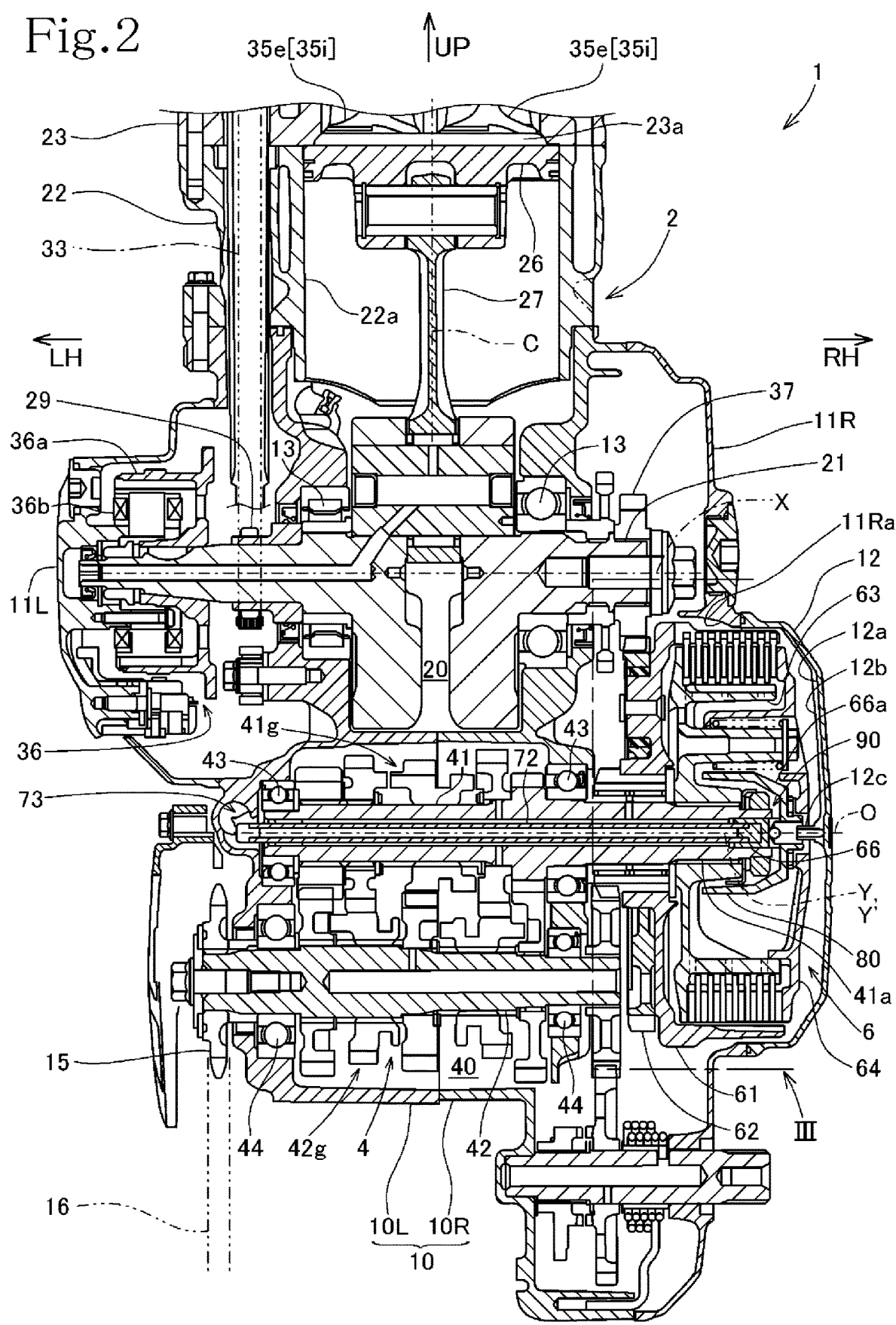
FIG. 2 is a cross-sectional developed view of the power unit as viewed along the arrow line II-II in FIG. 1.

FIG. 1 is a right side view, in partial section, of a power unit 1 including an oil supply structure of a clutch device according to a first embodiment of the invention, and FIG. 2 is a developed sectional view of the power unit 1, taken along an arrow line II-II in FIG. 1.

A power unit 1 according to a first embodiment of the invention is mounted on, for example, a motorcycle (not illustrated) as a vehicle as described above.

As illustrated in FIGS. 1 and 2, the power unit 1 includes a water-cooled single-cylinder four-stroke cycle internal combustion engine (hereinafter, simply referred to as an "internal combustion engine 2") and a transmission 4 that is coupled to the rear side of the internal combustion engine 2 to transmit the driving force of the internal combustion engine 2 in a predetermined number of speed shift positions. The power unit 1 is mounted on the vehicle with an axial center line X of a crankshaft 21 oriented in the width direction of the vehicle, that is, in right and left directions. In a state illustrated in FIG. 1, right side in the figure is a front side, an upper side in the figure is an upper side, a near side in the figure is a right side, and a far side in the figure is a left side.

The power unit 1 includes a unit casing 10 that defines a crank chamber 20 in a front half portion thereof and a transmission chamber 40 in a rear half portion. The crank chamber 20 receives therein the rotatably supported crankshaft 21 of the engine 2. The transmission chamber 40 houses the transmission 4. The unit casing 10 is integrally formed from the front to the rear.

The unit casing 10 is constituted to be transversely divided, formed of a left casing half body portion 10L and a right casing half body portion 10R.

In an upper portion of the crank chamber 20 of the unit casing 10, as illustrated in FIG. 1, a cylinder block 22, in which one cylinder bore 22a is centrally formed, is provided in an upwardly extending and forwardly inclining attitude and has a slightly forwardly inclining cylinder axis C, which is a center line of the cylinder bore 22a. Above the cylinder block 22, a cylinder head 23 and a cylinder head cover 25 are sequentially stacked on and fastened to the unit casing 10 with stud bolts 24. The upper side of the cylinder head 23 is covered by the cylinder head cover 25.

As illustrated in FIG. 2, the left side of the unit casing 10 is covered with a left casing cover 11L, while the right side of the unit casing 10 is covered with a right casing cover 11R. The right casing cover 11R has a clutch opening 11Ra through which a clutch device 6, which will be described later in detail, is inserted. The clutch opening 11Ra is shaped to surround the clutch device 6. The clutch opening 11Ra is applied with a clutch cover 12 installed so as to cover the clutch device 6.

In the cylinder bore 22a of the cylinder block 22, a piston 26 is reciprocatively and slidably fitted. The piston 26 is coupled to the crankshaft 21 via a connecting rod 27. The cylinder head 23 includes a combustion chamber 23a opposing to the piston 26. An ignition plug 28 (FIG. 1) is mounted in the cylinder head 23 to to be directed into the combustion chamber 23a.

The crankshaft 21 has its axial center line X oriented in the right and left directions and is rotatably supported by the left casing half body portion 10L and the right casing half body portion 10R (that is, by the unit casing 10) via main bearings 13.

A left side portion of the crankshaft 21 that extends to the left side from the main bearing 13 in the left casing half body portion 10L, is fitted with a cam chain driving sprocket 29. Around the cam chain driving sprocket 29 and a cam chain driven sprocket (not illustrated) fitted to a camshaft 31 (FIG. 1) in the cylinder head 23, a timing chain 33 is passed.

The cam chain driving sprocket 29, the timing chain 33, and the cam chain driven sprocket cause the rotation of the crankshaft 21 at a ½ rotational speed and transmit the rotation to the camshaft 31. A valve train 30 disposed above the cylinder head 23 operated to open and close an intake valve 35i and an exhaust valve 35e cooperating with the combustion chamber 23a at predetermined timings.

A left end portion of the crankshaft 21 is fitted with an outer rotor 36a of an AC generator 36. The left side of the outer rotor 36a is covered with the left casing cover 11L by which an inner stator 36b of the AC generator 36 is supported. The inner stator 36b is disposed inside the outer rotor 36a.

The right end portion of the crankshaft 21 extending rightward of the right casing half body portion 10R is fitted with a primary driving gear 37.

The transmission 4, which operates to transmit the driving force of the internal combustion engine 2 in predetermined speed shift positions, is a constant mesh type gear transmission. The transmission 4 includes a main shaft 41 and a counter shaft 42, and shift gear groups 41g and 42g. The main shaft 41 and the counter shaft 42 are supported in mutually parallel arrangement by the unit casing 10. The shift gear groups 41g and 42g are mounted on the main shaft 41 and the counter shaft 42 respectively. The transmission 4 switches combinations of the shift gear groups 41g and 42g that transmit power. The transmission 4 includes a shift operation mechanism (not illustrated) that changes shift positions of the transmission 4.

The main shaft 41 is arranged at a rear position of, and slightly above the crankshaft 21 such that an axial center line Y of the main shaft 41 is parallel with the axial center line X of the crankshaft 21. The main shaft 41 is rotatably supported by the unit casing 10 via bearings 43.

The counter shaft 42 is arranged at a rear position of the main shaft 41 in parallel with the main shaft 41. The counter shaft 42 is rotatably supported by the unit casing 10 via bearings 44.

The counter shaft 42 is an output shaft of the power unit 1, and as illustrated in FIG. 2, a left end portion of the counter shaft 42 extending leftward from the left casing half body portion 10L is fitted with a driving sprocket 15. Around the driving sprocket 15 and a driven sprocket (not illustrated) fitted to a rear axle (not illustrated) of the vehicle, an endless drive chain 16 is passed.

On a right end portion 41a, as one end portion, of the main shaft 41 as a power transmission shaft, which extends rightward from the right casing half body portion 10R, the multi-plate wet clutch device 6 is disposed.

Figure 3:
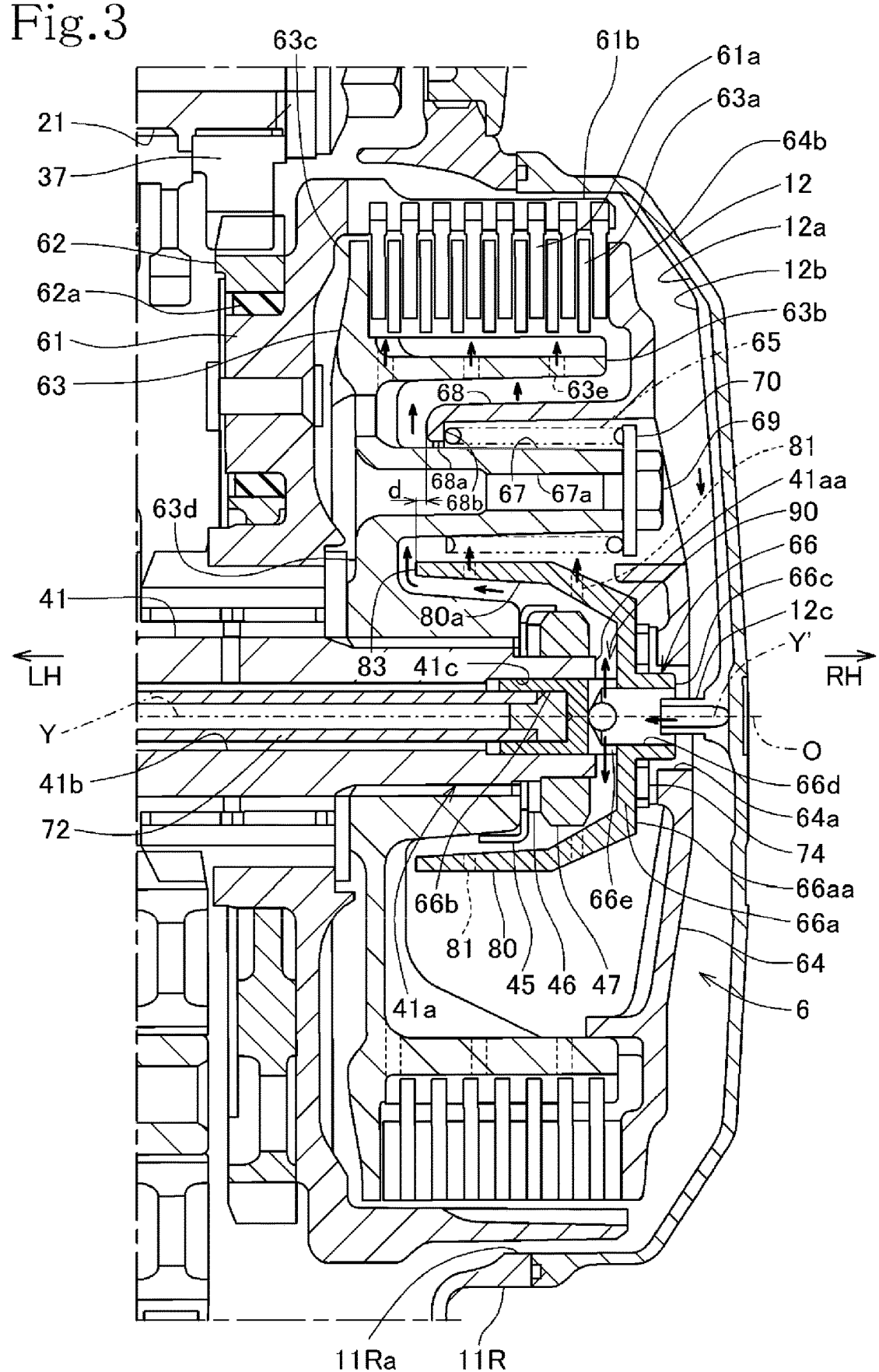
FIG. 3 is an enlarged view of a clutch device, showing a portion III in FIG. 2.

As shown in FIG. 3, an enlarged view of a portion III of FIG. 2, a clutch outer member 61 of the clutch device 6 is supported by a primary driven gear 62 rotatably supported by the main shaft 41 via cushioning members 62a, and is disposed coaxially with a clutch inner member 63 integrally fitted to and disposed on the main shaft 41.

The clutch inner member 63 is spline-fitted to the right end portion 41a of the main shaft 41 and secured to the right end portion 41a with a nut member 47 having a lock washer 45 and a thrust washer 46 inbetween.

Between the clutch inner member 63 and the clutch outer member 61, a plurality of first clutch disks 63a of the clutch inner member 63 and a plurality of second clutch disks 61a of the clutch outer member 61 are disposed. Between the clutch inner member 63 and the clutch outer member 61, the first and second clutch disks 63a and 61a, as frictional power transmitting members, are alternately stacked in the axial direction of the main shaft 41.

The clutch disks 63a of the clutch inner member 63 are so installed as to be incapable of moving in circumferential directions and capable of moving in the axial directions with respect to the clutch inner member 63. The clutch disks 61a of the clutch outer member 61 are so installed as to be incapable of moving in the circumferential directions and capable of moving in the axial directions with respect to the clutch outer member 61.

A clutch pressure member 64 is disposed opposing to the clutch inner member 63 with respect to the axial direction. The clutch pressure member 64 is configured so as to bring the clutch disks 63a and 61a, which are stacked in the axial direction between the clutch inner member 63 and the clutch outer member 61, into pressure contact with clutch springs 65 being compressed.

In such state, the first and second clutch disks 63a and 61a are mutually in pressure contact and engaged with each other, and rotation of the clutch outer member 61 is transmitted to the main shaft 41 as rotation of the clutch inner member 63.

That is, the clutch device is in a connecting state.

The clutch pressure member 64 has a center opening 64a in which a flange portion 66a of a clutch lifter member 66 is fitted. The clutch lifter member 66 axially faces the right end portion 41a of the main shaft 41. When the flange portion 66a is moved axially to the right to abut against and axially push the clutch pressure member 64 outward in the axial direction, the pressure contact of the clutch disks 63a and 61a caused by the clutch pressure member 64 is released.

In such state, rotation of the clutch outer member 61 is not transmitted to the clutch inner member 63.

That is, the clutch device is in a disconnected state.

The primary driven gear 62 meshes with the primary driving gear 37, which is fitted to the crankshaft 21. While rotational power of the crankshaft 21 is transmitted to the clutch device 6 via the primary driving gear 37 on the side of the crankshaft 21 and via the primary driven gear 62 on the side of the clutch device 6, the clutch device 6 is configured not to transmit the rotational power of the crankshaft 21 to the transmission 4 during gear shift of the transmission 4, and to transmit the rotational power of the crankshaft 21 to the main shaft 41 of the transmission 4 as soon as the gear shift of the transmission 4 is finished.

The clutch device 6 according to the first embodiment of the invention will further be described in detail with reference to FIG. 3, which is an enlarged view of the portion III of the clutch device 6 in FIG. 2.

The clutch outer member 61 is in the shape of a cylinder with a closed-bottom and opens toward the right side in the axial direction of the main shaft 41. Inside the clutch outer member 61 is disposed the clutch inner member 63 that is spline-fitted onto the main shaft 41 and fixedly secured to the main shaft 41 with the nut 47 screwed into the right shaft end of the main shaft 41.

The clutch inner member 63 is co-axial with the clutch outer member 61.

The clutch device 6 has its center line coinciding with the axial center line Y of the main shaft 41.

The clutch inner member 63 has a peripheral wall portion 63b whose outer peripheral surface supports the plurality of the first clutch disks 63a in a manner not rotatable relative to the clutch inner member 63 but slidable in the clutch axial center line Y.

The clutch outer member 61 has a peripheral wall portion 61b whose inner peripheral surface supports the plurality of the second clutch disks 61a in a manner not rotatable relative to the clutch outer member 61 but slidable in the clutch axial center line Y. The plurality of clutch disks 61a and the plurality of clutch disks 63a are alternately stacked in the direction of the clutch axial center line Y.

On the clutch disk 61a positioned at the axially outermost side (the rightmost side in the figure) among the clutch disks 63a and 61a, a pressing portion 64b of the clutch pressure member 64 is in abutment. The pressing portion 64b sandwiches the clutch disks 63a and 61a between itself and a pressure-receiving portion 63c formed on the clutch center member 63.

The clutch inner member 63 has a ring-shaped flat plate portion 63d that has a plurality of axially projecting bosses 67 (only one is shown in FIG. 3) extending toward the clutch pressure member 64. Each of the projecting bosses 67 has a screw hole 67a in the portion toward the distal end thereof.

On the other hand, the clutch pressure member 64 has a plurality of deep hole portions 68 (only one is shown in FIG. 3) depressed toward the side of the ring-shaped flat plate portion 63d of the clutch inner member 63. Each of the deep hole portions 68 has therein a through hole 68a.

Each of the projecting boss 67 is inserted through the through hole 68a of each of the deep hole portions 68 of the clutch pressure member 64 and projects into the deep hole portions 68. Each of the clutch springs 65 is made to be contracted between a washer 70 on the projecting boss 67 and a seat surface 68b formed on the deep hole portions 68. The washer 70 is fixed to the boss 67 with a bolt 69 screwed into the screw hole 67a of the boss 67. The seat surface 68b is formed on a bottom portion of the deep hole portions 68 of the clutch pressure member 64.

The peripheral wall portion 63b of the clutch inner member 63 has a plurality of communication holes 63e that communicate the inner peripheral side and the outer peripheral side. The communication holes 63e are drilled at positions distributed in the circumferential and axial directions.

Since the clutch pressure member 64 is pressed axially inward (leftward in the figures) by means of the clutch springs 65, the pressing portion 64b presses the clutch disks 63a and 61a toward the pressure-receiving 63c of the clutch inner member 63, and the clutch pressure member 64 is constantly biased to connect the clutch device 6.

A pressing force of the clutch pressure member 64 causes mutual frictional engagement of the clutch disks 63a and the clutch disks 61a, the rotational force of the clutch outer member 61 is transmitted to the clutch inner member 63, and the main shaft 41 is integrally rotated with the rotation of the clutch inner member 63.

The main shaft 41 has a hollow hole 41b concentric with the axial center line Y, and a clutch actuation shaft 72 is passed through the hollow hole 41b. The hollow hole 41b has an end portion on the side of the clutch device 6 (the right side in FIG. 3) that has an enlarged hole portion 41c having a cylindrical shape that opens to the right end of the main shaft 41. A leftwardly extending cylindrical portion of the clutch lifter member 66 is inserted into the enlarged hole portion 41c slidably in the axial directions.

The clutch lifter member 66 has a fitting hole 66b at a side to which the clutch lifter member 66 is inserted in the enlarged hole portion 41c. The fitting hole 66b is concentric with the axial center line Y of the main shaft 41 in the state of the clutch lifter member 66 being inserted. The clutch actuation shaft 72 has an end portion on the side of the clutch device 6 (the right side in the figure) inserted and fitted in the fitting hole 66b. The other end (the left end in the figure) of the clutch actuation shaft 72 is coupled to a clutch operation mechanism 73 illustrated in FIG. 2. The clutch operation mechanism 73 is connected to an oil supply conduit (not illustrated) to be supplied with hydraulic oil into the hollow hole 41b of the main shaft 41.

Figure 4:
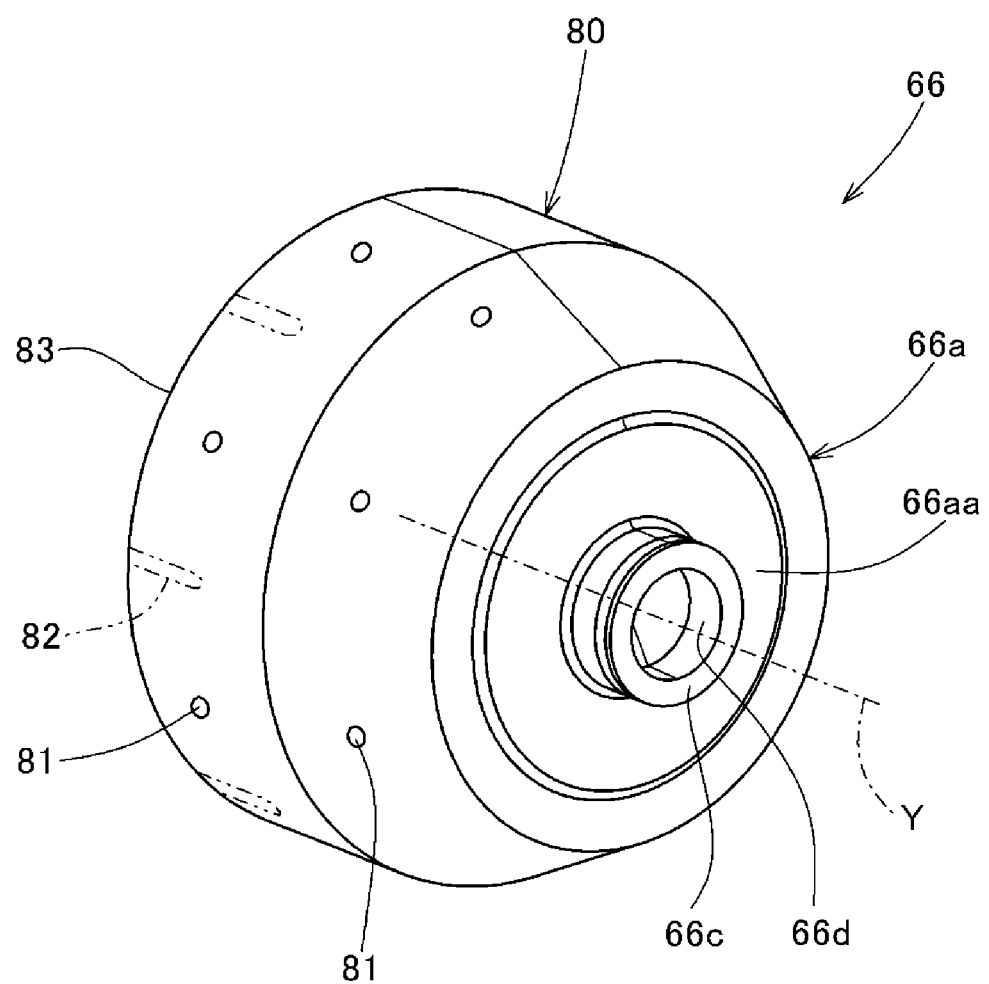
FIG. 4 is a perspective view of a bowl-shaped portion of a clutch lifter member.

The clutch lifter member 66 has an outer end portion 66c in the opposite side of the fitting hole 66b, as also shown in FIG. 4. The outer end portion 66c has an open oil reception hole 66d drilled and disposed concentric with the fitting hole 66b. The oil reception hole 66d has a bottom portion that does not communicate with the fitting hole 66b. The bottom portion of the oil reception hole 66d opens to the outer circumferential surface of the clutch lifter member 66 by way of oil outflow holes 66e (FIG. 3) that are vertically directed.

A portion where the oil reception hole 66d of the clutch lifter member 66 is formed has an outer peripheral wall surface. The outer peripheral wall surface integrally has the flange portion 66a convexly formed to axially face the right end portion 41a of the main shaft 41 to move the clutch pressure member 64 axially outward so as to release the pressure contact of the clutch disks 63a and 61a.

On the other hand, the clutch pressure member 64 has its center axis Y' positioned substantially coincident to the clutch axial center line Y in the state where the clutch device 6 is assembled, and the center opening 64a of the clutch pressure member 64 extends coaxially with the center axis Y' of the clutch pressure member 64.

In such state, the outer end portion 66c of the clutch lifter member 66 is positioned within the center opening 64a of the clutch pressure member 64, and the flange portion 66a of the clutch lifter member 66 abuts on an axially inner surface of the circumferential wall defining the center opening 64a of the clutch pressure member 64 via a bearing 74.

The flange portion 66a integrally has a bowl-shaped portion 80 formed to extend, from the outer circumference of a surface 66aa for abutment with the bearing 74, in a bowl shape as it extends to the outer periphery thereof, in a direction to circumferentially cover and surround the right end portion 41a of the main shaft 41.

It should be noted that in the first embodiment of the invention, the bowl-shaped portion 80 is formed by integrally molding it with the flange portion 66a, but the bowl-shaped portion 80 may be formed into a similar shape with a different member or members assembled to the flange portion 66a. This is also true with second and third embodiments of the invention to be described later.

When the clutch operation mechanism 73 (see FIG. 2) shifts the clutch actuation shaft 72 outward in the axial direction, the clutch actuation shaft 72 presses the clutch pressure member 64 outward (rightward in the figure) in the direction of the clutch axial center line Y via the flange portion 66a of the clutch lifter member 66 and the bearing 74.

When the clutch pressure member 64 moves outward to the right in the direction of the clutch axial center line Y against the biasing forces of the clutch springs 65, the pressing force of the clutch pressure member 64 to the clutch disks 63a and 61a decreases, and the frictional engagement between the adjoining clutch disks 63a and 61a is released. At this time, the rotational force of the clutch outer member 61 is no longer transmitted to the clutch inner member 63, so that the clutch device 6 is brought into the disconnected state.

Next, when the pressing force directed outward (rightward) in the direction of the clutch axial center line Y from the clutch operation mechanism 73 is released, the clutch pressure member 64 presses back the clutch lifter member 66 under the forces of the clutch springs 65, and the clutch actuation shaft 72 is caused to move inward (leftward) in the direction of the clutch axial center line Y. Therefore, the pressing force of the clutch pressure member 64 to the clutch disks 63a and 61a recovers so as to bring the clutch device 6 back into the connecting state.

The clutch cover 12 is installed so as to cover the outside of the clutch device 6 and to be positioned in the clutch opening 11Ra of the right casing cover 11R. As illustrated in FIG. 3, the clutch cover 12 is formed with ribs 12b on an inner surface 12a of the clutch cover 12 in the assembled state, the ribs 12b extending from a center portion O, coinciding with the clutch axial center line Y, to an upper part of the outer periphery of the clutch cover 12.

The lower ends of the ribs 12b form a protruding portion 12c that protrudes at the center portion O of the clutch cover 12 into the clutch pressure member 64. The protruding portion 12c has a trough shape with an upper side opened.

The protruding portion 12c is positioned to protrude into the center opening 64a in the center portion of the clutch pressure member 64. Accordingly, the protruding portion 12c reaches the interior of the end opening of the oil reception hole 66d in the outer end portion 66c of the clutch lifter member 66 and is positioned within the center opening 64a.

With the clutch device 6 according to the first embodiment as described above, when the internal combustion engine 2 of the power unit 1 is operated, the clutch outer member 61 scrapes the oil and the clutch device 6 is lubricated. When the rotational speed of the internal combustion engine 2 increases, the oil supply to the clutch device 6 is performed mainly by the inner surface 12a of the clutch cover 12 capturing the oil in forms of mist and spray and guiding the oil to the clutch disks 63a and 61a.

With reference to FIG. 3, the oil in the forms of mist and spray is captured with the inner surface 12a of the clutch cover 12, guided by the ribs 12b extending from the upper portion of the outer periphery to the center portion O, collected into the protruding portion 12c provided at their lower ends, and the oil flows into the center opening 64a in the center portion of the clutch pressure member 64 into which the protruding portion 12c protrudes.

A most part of the oil supplied to the center opening 64a is supplied into the oil reception hole 66d of the clutch lifter member 66 extending in the center opening 64a, and the oil flows out in radial directions through the oil outflow holes 66e by centrifugal force produced by the clutch lifter member 66 that is rotating together with the clutch inner member 63 and the clutch pressure member 64.

That is, the clutch device 6 of the embodiment includes an oil supply portion 90 having the oil outflow holes 66e in the distal end of the right end portion 41a of the main shaft 41.

In a case where the oil supply portion 90 is provided adjacent to the distal end of the right end portion 41a of the main shaft 41, oil flowing out from the region of the distal end of the right end portion 41a of the main shaft 41 tends to be supplied easily to the clutch disks 63a and 61a positioned in the region around the axial center line Y of the main shaft 41. However, in the clutch device 6 according to the embodiment of the invention, the flange portion 66a of the clutch lifter member 66 has the bowl-shaped portion 80 formed into the bowl shape as it extends from the outer circumference of the abutting surface 66aa with the bearing 74 to the outer periphery of the bowl shape, in a manner to surround the right end portion 41a of the main shaft 41 so as to avoid interference with the deep hole portions 68 and the clutch springs 65 of the clutch pressure member 64.

Therefore, the oil flowing out in radial directions from the oil supply portion 90 having the oil outflow holes 66e is caused to flow inside the bowl-shaped portion 80 of the clutch lifter member 66. This means that the bowl-shaped portion 80 functions to guide the oil along the inner surface of the bowl-shaped portion 80 axially inward (leftward) in the direction of the axial center line Y of the main shaft 41. Thus, oil supply to portions of the clutch disks 63a and 61a positioned axially inner or far side is increased, so that oil supply performance of the clutch device 6 is improved.

The bowl-shaped portion 80 has an axially innermost end edge 83. This innermost end edge 83 is provided at an axial position more inner side than the axially inner end of the deep hole portions 68 of the clutch pressure member 64, by an axial distance "d" along the axial center line Y as illustrated in FIG. 3. The end edge 83 of the bowl-shaped portion 80 is configured such that the oil flowing out of the end edge 83 reaches the peripheral wall portion 63b of the clutch inner member 63, avoiding the deep hole portions 68 as possible as it can, whereby lubrication of the clutch disks 63a and 61a is facilitated.

The bowl-shaped portion 80 of the clutch lifter member 66 extends in the direction of the axial center line Y of the main shaft 41 so as to cover the nut member 47 that fixes the clutch inner member 63 to the right end portion 41a of the main shaft 41, whereby the nut member 47 is protected and the lock washer 45 for stopping the nut member 47 is prevented from loosening.

As illustrated in FIG. 4, a perspective view of the bowl-shaped portion 80 of the clutch lifter member 66, the bowl-shaped portion 80 has a plurality of penetrating oil supply outlet holes 81 that communicate the inside and the outside of the bowl-shaped portion 80. The oil supply outlet holes 81 are formed in an arrangement dispersed or distributed radially and in the direction of the axial center line Y of the main shaft 41.

This achieves an optimization of an oil supply amount and oil supply locations for the clutch disks 63a and 61a, from inside the bowl-shaped portion 80.

The oil supply outlet holes 81 may be replaced by appropriate slits 82, as shown in FIG. 4.

Figure 5:
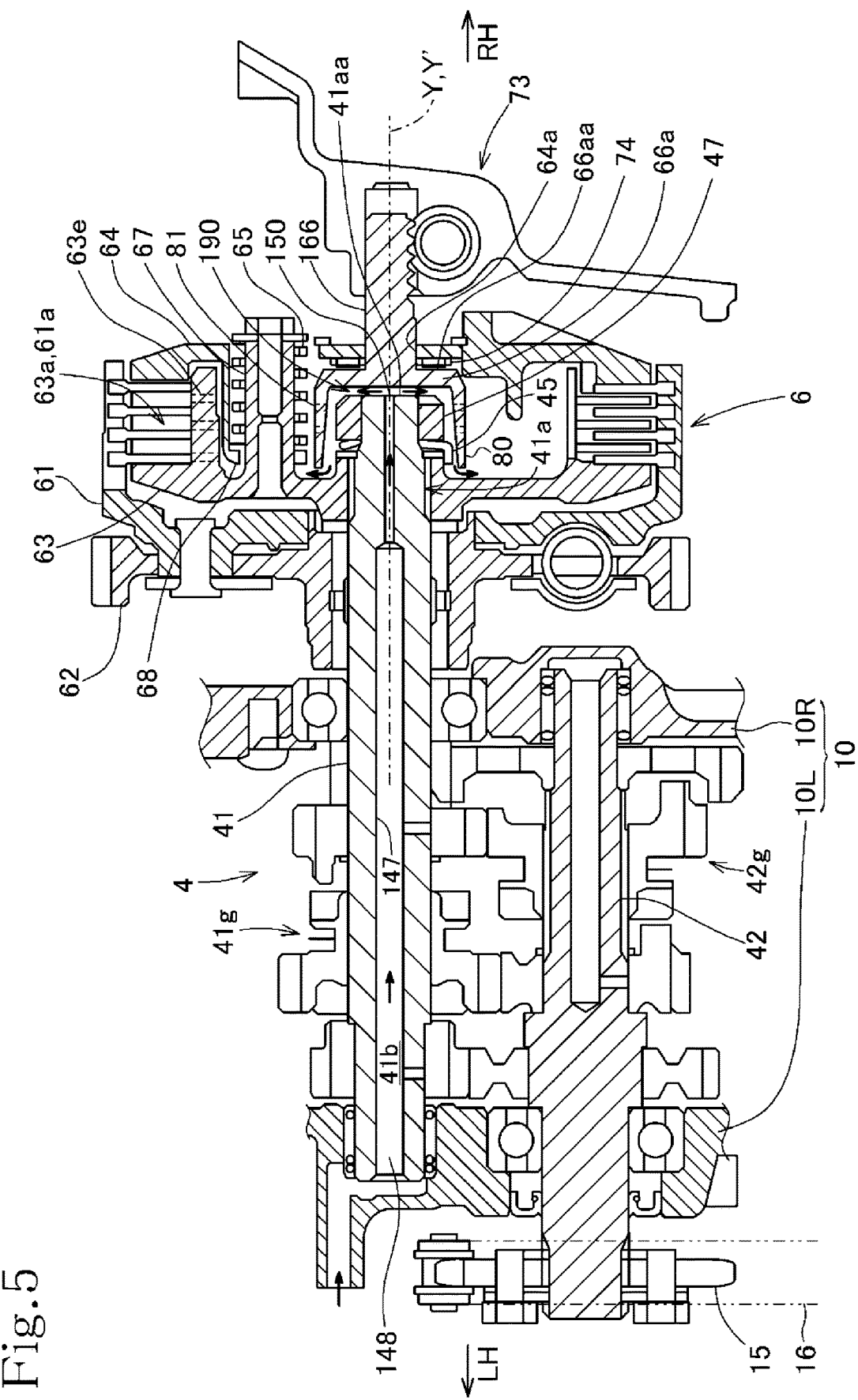
FIG. 5 is a sectional view, along a main shaft and a counter shaft, of a clutch device and a transmission, with an oil supply structure according to a second embodiment of the invention.

With reference to FIG. 5, a description will be given of a second embodiment of the present invention. FIG. 5 is a cross-sectional view of a main portion of a clutch device and a transmission in the second embodiment, taken along a main shaft and a counter shaft.

In this second embodiment, members having a function similar to members of the first embodiment will be designated with identical reference signs and description will be omitted or simplified. Members having a structure and a function different from those of the first embodiment will be designated with reference signs of three figures by adding "100".

In the second embodiment, a clutch lifter member 166 is provided, which includes the flange portion 66a that is in opposition axially to the right end portion 41a of the main shaft 41 to move the clutch pressure member 64 so as to release the pressure contact between the clutch disks 63a and 61a. However, the clutch lifter member 166 is not fitted in the right end portion 41a of the main shaft 41, unlike the first embodiment.

The clutch lifter member 166 of the second embodiment is installed to a clutch cover (not illustrated) together with a clutch operation mechanism 173. The inner end of the clutch lifter member 166 in the direction of the axial center line Y of the main shaft 41 is passed through the center opening 64a of the clutch pressure member 64. The clutch lifter member 166 has the flange portion 66a for moving the clutch pressure member 64 via the bearing 74 so as to release the pressure contact of the clutch disks 63a and 61a.

A clutch operation mechanism similar to the clutch operation mechanism 73 (FIG. 2) is provided in an outer side (not shown) in the axial direction of the clutch pressure member 64.

While the main shaft 41 does not include a clutch actuation shaft as used in the first embodiment, an oil passage 147 is formed in the main shaft 41 along the axial center line Y. An oil inlet 148 is formed in a left end of the main shaft 41 and an oil outlet 150 is formed in a right distal end surface 41aa.

That is, in the second embodiment, an oil supply portion 190 having the oil outlet 150 is provided in the distal end of the right end portion 41a of the main shaft 41.

Also in the second embodiment, the flange portion 66a includes the bowl-shaped portion 80 formed in a bowl shape as the flange portion extends axially, from the outer circumference of the abutting surface 66aa with the bearing 74 to the outer periphery thereof, in a manner to cover or surround the right end portion 41a of the main shaft 41 so as to avoid interference with the deep hole portions 68 and the clutch springs 65 of the clutch pressure member 64, in a similar manner to the first embodiment. The end edge 83 of the bowl-shaped portion 80 is also located at an axially inner position by the axial distance "d" (see FIG. 3) than the axially innermost end of the deep hole portions 68.

The oil flowing out of the oil supply portion 190 having the oil outlet 150 is caused to flow out in radial directions by the centrifugal force produced by the rotation of the main shaft 41 to be supplied inside the bowl-shaped portion 80 of the clutch lifter member 166. The bowl-shaped portion 80 functions to guide the oil along the inner side surface thereof in the direction of the axial center line Y of the main shaft 41. Thus, the oil supply to portions of the clutch disks 63a and 61a positioned near the axial center line Y is made satisfactory, whereby oil supply performance of the clutch device 6 is improved.

Also in the second embodiment, the bowl-shaped portion 80 of the clutch lifter member 66 extends in a radially inner region along the axial center line Y of the main shaft 41 so as to cover the nut member 47 that fixes the clutch center member 63 to the right end portion 41a of the main shaft 41, whereby the nut member 47 is protected and the lock washer 45 for stopping the nut member 47 is prevented from loosening.

Also in the second embodiment, similarly to the illustration in FIG. 4 showing the first embodiment, the bowl-shaped portion 80 may have the plurality of penetrating oil supply outlet holes 81 that communicate the inside and the outside of the bowl-shaped portion 80. The oil supply outlet holes 81 may be formed in a radially and axially dispersed arrangement. This achieves optimization of the oil supply amount and the oil supply locations.

The oil supply outlet holes 81 may be replaced by the appropriate slits 82.

Figure 6:
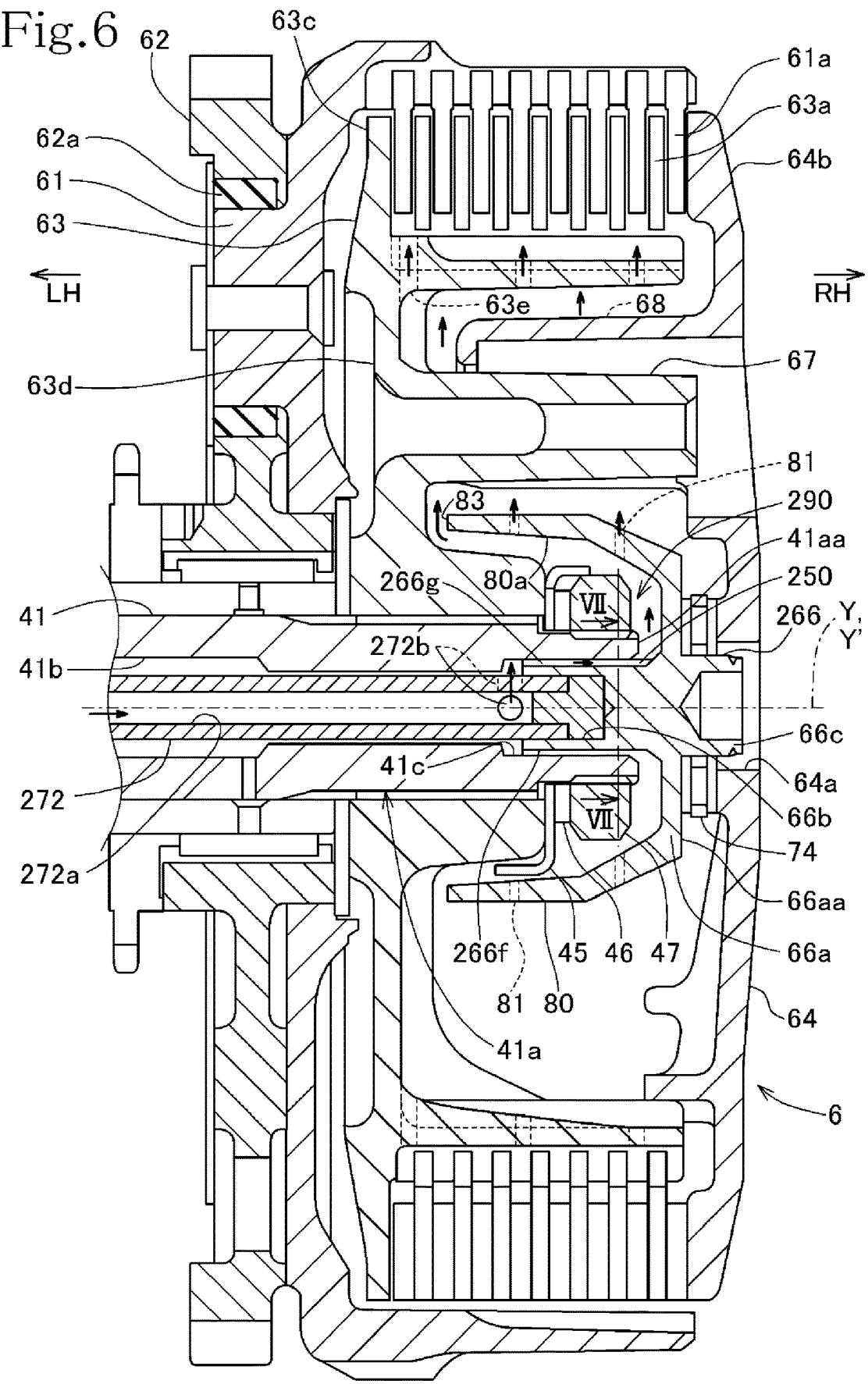
FIG. 6 is a sectional view, similar to FIG. 3 showing the first embodiment, of a clutch device with an oil supply structure in a third embodiment of the invention.

With reference to FIG. 6, a description will be given of a third embodiment of the present invention. FIG. 6 is a cross-sectional view of the clutch device 6 according to the third embodiment, illustrating cross-sectional surfaces similar to FIG. 3 showing the first embodiment.

In the third embodiment, members having a function similar to those of the described first embodiment will be designated with identical reference signs and the description will be omitted or simplified. Members having a structure and a function different from those of the first embodiment will be designated with reference signs of three figures by adding "200".

In the third embodiment, the ribs 12b (FIGS. 2, 3) on the inner surface 12a of the clutch cover 12 and the protruding portion 12c provided in the lower ends of the ribs 12b to supply oil into the oil reception hole 66d of the clutch lifter member 66 and to cause the oil to flow out radially from the oil output hole 66e, are not employed, unlike the first embodiment.

In the third embodiment, oil is supplied axially into the main shaft 41 as indicated by the arrow, an oil outlet 250 is provided in the right distal end surface 41aa of the main shaft 41, and an oil supply portion 290 having the oil outlet 250 is provided in the distal end of the right end portion 41a of the main shaft 41.

That is, the main shaft 41 has the hollow hole 41b formed to be concentric with the axial center line Y and a clutch actuation shaft 272 is passed through the main shaft 41. The end portion of the hollow hole 41b on the side of of the clutch device 6 (right side in the figure) has the enlarged hole portion 41c having a cylindrical shape opening to the right end of the main shaft 41. In the enlarged hole portion 41c, a clutch lifter member 266 is fitted slidably in the axial direction.

The clutch lifter member 266 has the fitting hole 66b in a side at which the clutch lifter member 266 is fitted in the enlarged hole portion 41c. The fitting hole 66b is concentric with the axial center line Y of the main shaft 41 in the state in which the clutch lifter member 266 is fitted in the enlarged hole portion 41c. An end portion of the clutch actuation shaft 272 on the side (right side in the figure) of the clutch device 6 is inserted and fitted in the fitting hole 66b.

The other end (the left end in the figure) of the clutch actuation shaft 272 is coupled to the clutch operation mechanism 73 (see FIG. 2) similarly to the first embodiment. The clutch operation mechanism 73 is connected to an oil supply conduit (not illustrated) to supply oil into the hollow hole 41b of the main shaft 41. The clutch actuation shaft 272 is a hollow tube. The oil is then supplied into a hollow portion 272a of the clutch actuation shaft 272.

On the outer peripheral surface of the clutch lifter member 266 positioned outside the right distal end surface 41aa of the main shaft 41, the flange portion 66a is convexly formed to axially face the right end portion 41a of the main shaft 41 to move the clutch pressure member 64 so as to release the pressure contact of the clutch disks 63a and 61a.

On the other hand, the clutch pressure member 64 has its center axis Y' positioned substantially coinciding with the clutch axial center line Y in the state of the clutch device 6 being assembled. In the center opening 64a of the clutch pressure member 64 extends the clutch lifter member 266 coaxially.

In such state, the outer end portion 66c of the clutch lifter member 266 is positioned within the center opening 64a of the clutch pressure member 64, and the flange portion 66a of the clutch lifter member 266 abuts on the axially inner surface around the center opening 64a of the clutch pressure member 64 via the bearing 74.

Then, the flange portion 66a has the bowl-shaped portion 80 so formed in a bowl shape as to extend from the outer circumference of the abutting surface 66aa with the bearing 74 to cover or surround the right end portion 41a of the main shaft 41 in a manner to avoid interference with the deep hole portions 68 and the clutch springs 65 for the clutch pressure member 64.

The clutch lifter member 266 has a tubular portion 266f that is slidably inserted in the axial direction in the enlarged hole portion 41c of the right end portion 41a of the main shaft 41. The tubular portion 266f is positioned by the clutch actuation shaft 272 inserted and fitted in the main shaft 41.

In the main shaft 41, oil is supplied into the hollow portion 272a of the clutch actuation shaft 272 inserted through the hollow hole 41b. The clutch actuation shaft 272 has an oil passing hole 272b that communicates the interior of the hollow portion 272a to the enlarged hole portion 41c at a position outside the fitting hole 66b of the clutch lifter member 266 and within the enlarged hole portion 41c of the main shaft 41.

Figure 7:
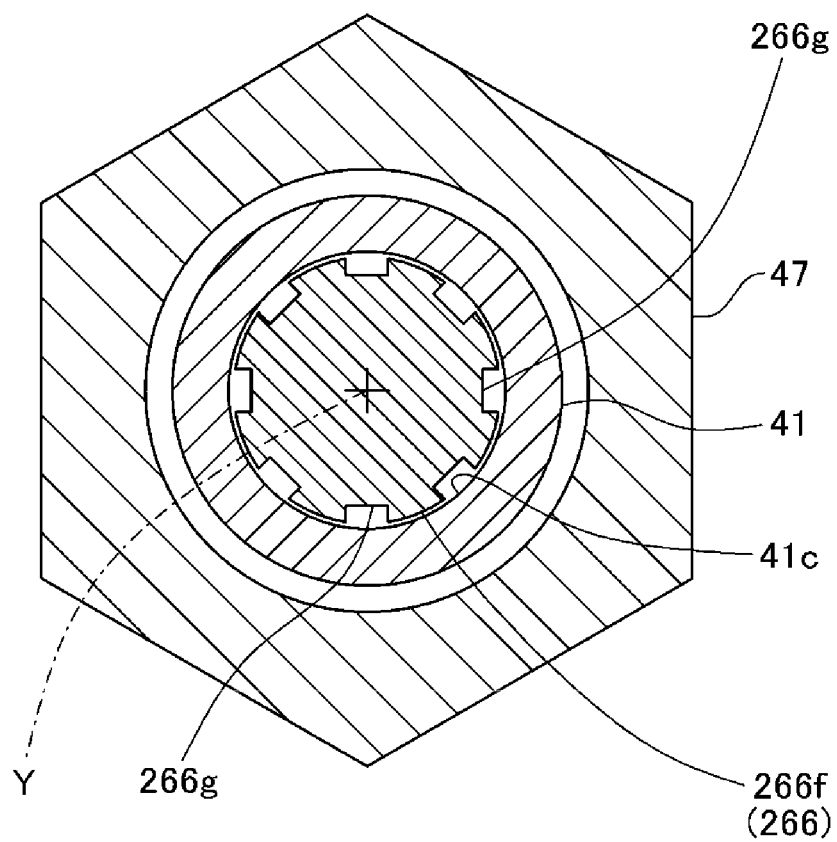
FIG. 7 is a cross-sectional view of a tubular portion of the clutch lifter member, taken along the arrow line VII-VII in FIG. 6.

As shown in FIG. 7, which is a cross-sectional view of the tubular portion 266f of the clutch lifter member 266 as viewed in the direction of arrow line VII-VII in FIG. 6, the outer periphery of the tubular portion 266f is formed with a plurality of oil passage grooves 266g that supply oil inside the main shaft 41 to the inside of the bowl-shaped portion 80. The oil flows from the hollow portion 272a through the oil passage grooves 266g to the enlarged hole portion 41c. The oil passages grooves 266g are disposed to extend in the direction of the axial center line Y of the main shaft 41.

The oil passage grooves 266g end at the right distal end surface 41aa of the main shaft 41 and forms the oil outlet 250.

Within the main shaft 41, oil inside the hollow portion 272a of the clutch actuation shaft 272 flows into the enlarged hole portion 41c through the oil passing hole 272b, passes through the oil passages grooves 266g in the outer periphery of the tubular portion 266f of the clutch lifter member 266 that is in sliding contact with the inner periphery of the enlarged hole portion 41c, and flows out from the oil outlet 250 at the right distal end surface 41aa of the main shaft 41.

That is, in the third embodiment, the oil supply portion 290 having the oil outlet 250 is disposed adjacent to the distal end of the right end portion 41a of the main shaft 41.

As described above, in the case where the oil supply portion 290 is provided adjacent to the distal end of the right end portion 41a of the main shaft 41, oil that flows out from the distal end of the right end portion 41a of the main shaft 41 tends to be supplied directly to portions of the clutch disks 63a and 61a positioned adjacent to the axial center line Y. However, in the clutch device 6 of the third embodiment, the flange portion 66a of the clutch lifter member 266 has the bowl-shaped portion 80 formed to axially extend from the outer circumference of the abutting surface 66aa with the bearing 74 to cover the right end portion 41a of the main shaft 41 so as to avoid interference with the deep hole portions 68 and the clutch springs 65 of the clutch pressure member 64.

The end edge 83 of the bowl-shaped portion 80 is positioned inward in the direction of the axial center line Y by the distance "d" (see FIG. 3) relative to the deep hole portions 68.

Therefore, oil flowing out of the oil supply portion 290 having the oil outlet 250 flows in radial directions by the centrifugal force produced by the rotation of the main shaft 41, and the oil is supplied inside the bowl-shaped portion 80 of the clutch lifter member 266. The bowl-shaped portion 80 can guide the oil along the inner surface thereof in the direction of the axial center line Y of the main shaft 41. Thus, the oil supply to portions of the clutch disks 63a and 61a positioned axially inward or axially far from the axially rightmost clutch disk 61a with respect to the axial center line Y is made more effective, whereby oil supply performance of the clutch device 6 is improved.

The oil passage 266g grooves formed in the direction of the axial center line Y of the main shaft 41 in the outer periphery of the tubular portion 266f provides effective lubrication with oil, whereby operability of the clutch lifter member 266 is improved. Due to the groove shape in the direction of the axial center line Y, productivity of the oil passage grooves 266g is improved to achieve a cost reduction.

The bowl-shaped portion 80 of the clutch lifter member 266 extends in the direction of the axial center line Y of the main shaft 41 so as to cover and surround the nut member 47 that fixes the clutch center member 63 to the right end portion 41a of the main shaft 41, whereby the nut member 47 is protected and the lock washer 45 for stopping the nut member 47 is prevented from loosening.

The bowl-shaped portion 80 in the third embodiment is similar to the illustration of the first embodiment in FIG. 4. The bowl-shaped portion 80 that rotates together with the main shaft 41 may have the plurality of oil supply outlet holes 81 that penetrate and communicate the inside and the outside of the bowl-shaped portion 80. The oil supply outlet holes 81 may be formed to be dispersed or distributed in circumferential and axial directions. This achieves optimization of the oil supply amount and oil supply sites.

The oil supply outlet holes 81 may be replaced with the appropriate slits 82.

Figure 8:
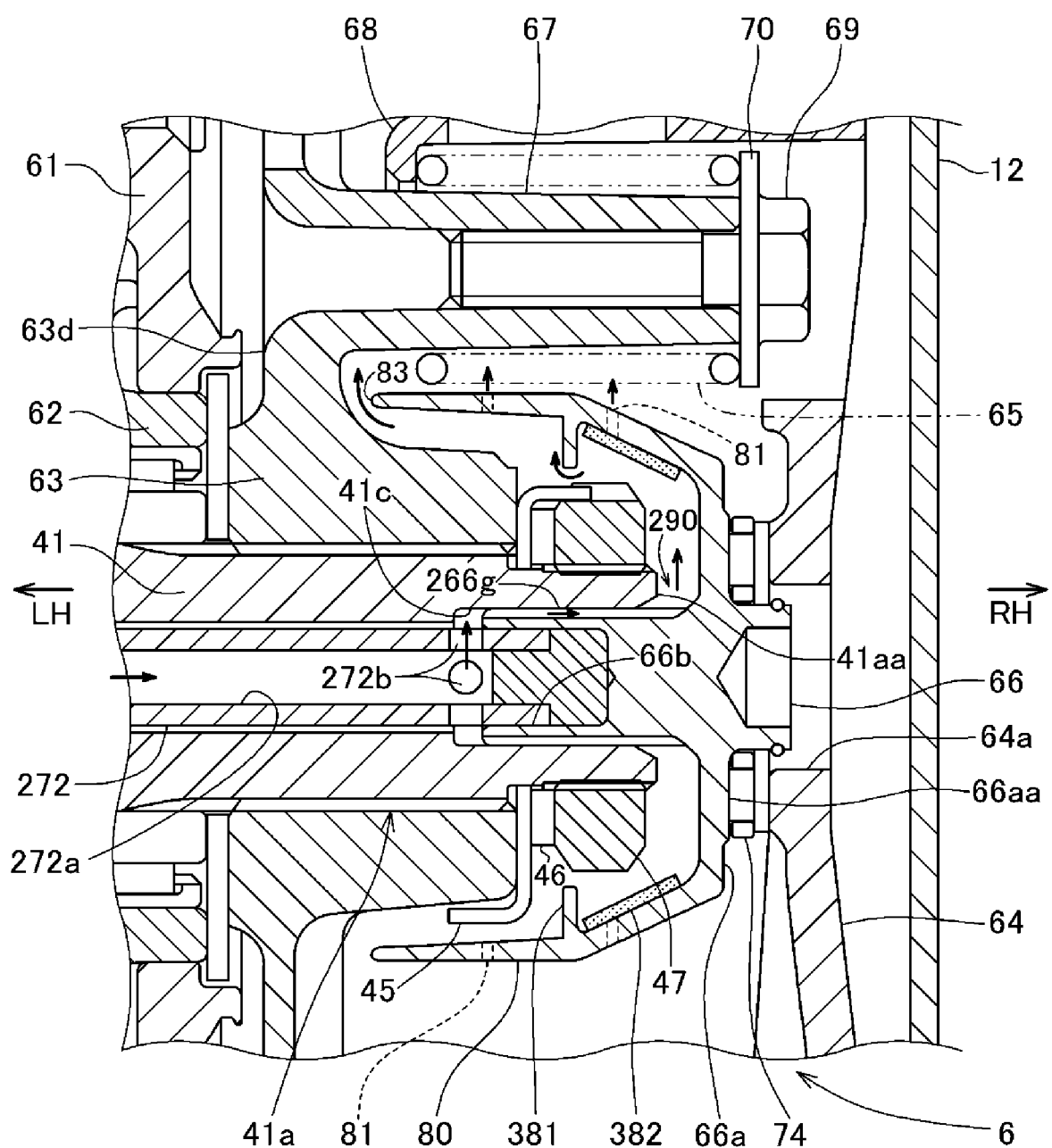
FIG. 8 is a sectional view, similar to FIG. 6, of a clutch device with an oil supply structure according of a modification of the third embodiment.

With reference to FIG. 8, a description will be given of a modification of the third embodiment. FIG. 8 is a cross-sectional view, similar to FIG. 6, of the clutch device 6 of the modification of the third embodiment, illustrating a center main part of the modification.

In this modification, members having a function similar to those of the third embodiment are designated with identical reference signs and the description is omitted or simplified. New member are designated with reference signs of three letters by adding "300".

In this modification, a weir-shaped separator 381 is arranged upright. The weir-shaped separator 381 extends in the circumferential direction on the inner surface 80a of the bowl-shaped portion 80.

Since the bowl-shaped portion 80 is also rotated by the rotation of the main shaft 41, the weir-shaped separator 381 produces an effect of damming up impurities as a centrifugal filter.

In this modification, a magnet 382 is disposed in the inner surface 80a of the bowl-shaped portion 80.

The magnet 382 attracts magnetic materials, such as iron powder in the oil supplied inside the bowl-shaped portion 80, thus providing a filtering effect for the oil.

Only one of the weir-shaped separator 381 and the magnet 382 may be provided. While each of them provides the above-described effect, it is preferred to provide both of them as in this modification.

That is, the weir-shaped separator 381 extending in the circumferential direction in the inner surface 80a of the bowl-shaped portion 80 is arranged upright and the magnet 382 is disposed in the inner surface 80a of the bowl-shaped portion 80 at a position toward the center of the bowl-shaped portion 80 relative to the separator 381. This improves the effect of the weir-shaped separator 381 damming up the impurities as the centrifugal filter, not only when the separator 381 is rotating but also when the separator 381 is stopped.

The bowl-shaped portion 80 of this modification is similarly usable as a modification of the above-described first embodiment.

That is, since the bowl-shaped portion 80 also rotates by the rotation of the main shaft 41 in the first embodiment similarly to the third embodiment, the weir-shaped separator 381 also serves as the centrifugal filter in the first embodiment. Provision of the magnet 382 on the inner surface 80a of the bowl-shaped portion 80 provides the filtering effect for the oil by the magnet 382 attracting the magnetic materials, such as the iron powder in the oil.

Also in the first embodiment, in addition to the separator 381, the magnet 382 could be provided on the inner surface 80a of the bowl-shaped portion 80 toward the center side relative to the separator 381. This provides an effect of improving the effect of the weir-shaped separator 381 damming up the impurities as the centrifugal filter, not only when the separator 381 is rotating but also when the separator 381 is stopped.

It should be noted that in the above-described third embodiment or its modification, not only the oil supply portion 290 having the oil outlet 250, the oil supply portion 90 illustrated in the first embodiment may additionally be provided. That is, the oil supply portion 90 may be further provided, which has the oil output hole 66e where oil trapped with the inner surface 12a of the clutch cover 12 is supplied through the oil output hole 66e of the clutch lifter member 66.

While the present invention has been described based on the above-mentioned respective embodiments and its modification, the present invention is not limited to the aspects indicated by the above-described embodiments and its modification, and a various configurations are included in the range of the gist of the present invention.

In the above-mentioned respective embodiments, for convenience of explanation, the description has been made in accordance with the arrangement on the right and left in the drawings. The arrangement where the right and left are inverted is also included in the present invention.

REFERENCE SIGN LIST

1 . . . Power unit
2 . . . Internal combustion engine
6 . . . Clutch device
10 . . . Unit casing
10R . . . Right casing half body portion
11R . . . Right casing cover
12 . . . Clutch cover
12a . . . Inner surface
12b . . . Ribs
12c . . . Protruding portion
21 . . . Crankshaft
20 . . . Crank chamber
37 . . . Primary driving gear
40 . . . Transmission chamber
41 . . . Main shaft (power transmission shaft)
41a . . . Right end portion (one end portion)
41aa . . . Right distal end surface
41b . . . Hollow hole
41c . . . Enlarged hole portion
42 . . . Counter shaft
45 . . . Lock washer
46 . . . Thrust washer
47 . . . Nut member
61 . . . Clutch outer member
61a . . . Clutch disk
61b . . . Peripheral wall portion
62 . . . Primary driven gear
63 . . . Clutch inner member
63a . . . Clutch disk
63b . . . Peripheral wall portion
63c . . . Pressed portion
63e . . . Communication hole
64 . . . Clutch pressure member
64a . . . Center opening
64b . . . Pressing portion
65 . . . Clutch spring
66 . . . Clutch lifter member
66a . . . Flange portion
66aa . . . Abutting surface
66b . . . Fitting hole
66c . . . Outer end portion
66d . . . Oil reception hole
66e . . . Oil output hole
67 . . . Projecting boss
68 . . . Deep hole portion
72 . . . Clutch actuation shaft
73 . . . Clutch operation mechanism
74 . . . Bearing
80 . . . Bowl-shaped portion
80a . . . Inner surface
81 . . . Oil supply outlet hole
82 . . . Slit
147 . . . Oil passage
148 . . . Oil inlet
150 . . . Oil outlet
166 . . . Clutch lifter member
173 . . . Clutch operation mechanism
190 . . . Oil supply portion
250 . . . Oil outlet
266 . . . Clutch lifter member
266f . . . Tubular portion
266g . . . Oil passage groove 272 ... Clutch actuation shaft
272a ... Hollow portion
272b ... Oil passing hole
290 ... Oil supply portion
381 ... Separator
382 ... Magnet
C ... Cylinder axis
X ... Axial center line (of crankshaft 21)
Y ... Axial center line (of main shaft 41), clutch axis center line
Y' ... Center axis (of clutch pressure member 64)
O ... Center portion (of inner surface 12a of clutch cover 12)

The invention claimed is:

1. An oil supply structure of a clutch device comprising:
a clutch inner member provided on one end portion of a power transmission shaft;
a clutch outer member provided coaxially with the clutch inner member;
a plurality of first and second frictional power transmitting members supported on the clutch inner and outer members, respectively, and disposed between the clutch inner and outer members, the first and second frictional power transmitting members being alternately stacked between the clutch inner and outer members;
a clutch pressure member disposed to oppose to the clutch inner member in an axial direction of the power transmission shaft, the clutch pressure member being operative to bring the first and second frictional power transmitting members into pressure contact; and
an oil supply device provided adjacent to a distal end of the one end portion of the power transmission shaft to supply oil to the distal end of the one end portion:
wherein the clutch device includes a clutch lifter member axially movable to axially urge the clutch pressure member so as to release the pressure contact between the first and second frictional power transmitting members, the clutch lifter member having a flange portion facing the one end portion of the power transmission shaft in the axial direction of the power transmission shaft; and
the flange portion has a bowl-shaped portion formed to define a bowl shape extending axially to an open outer periphery thereof, in a manner to cover and surround the one end portion of the power transmission shaft.

2. The oil supply structure of the clutch device according to claim 1,
wherein the clutch inner member is fixed to the one end portion of the power transmission shaft by means of a nut member member, and the bowl-shaped portion of the clutch lifter member extends axially inward in the direction of an axial center line of the power transmission shaft so as to cover and surround the nut member.

3. The oil supply structure of the clutch device according to claim 2,
wherein the bowl-shaped portion of the clutch lifter member includes a plurality of oil supply outlet holes communicating an inside and an outside of the bowl-shaped portion, the oil supply outlet holes being dispersed circumferentially and axially of the bowl-shaped portion.

4. The oil supply structure of the clutch device according to claim 2,
wherein the bowl-shaped portion has on an inner surface thereof an upright weir-shaped separator extending in a circumferential direction of the bowl-shaped portion.

5. The oil supply structure of the clutch device according to claim 2,
wherein the bowl-shaped portion has on an inner surface thereof a magnet fixed thereto.

6. The oil supply structure of the clutch device according to claim 2,
wherein the bowl-shaped portion has, on an inner surface thereof, an upright weir-shaped separator extending in a circumferential direction of the bowl-shaped portion, and a magnet fixed thereto, the magnet being disposed at a position nearer to a central portion of bowl-shaped portion (80) than the weir-shaped separator.

7. The oil supply structure of the clutch device according to claim 1,
wherein the clutch lifter member has a tubular portion coaxially fitted in an axial inner hole formed in the one end portion of the power transmission shaft; and
the tubular portion of the clutch lifter member has therearound a plurality of oil passages for axially guiding oil supplied in the power transmission shaft to the oil supply device adjacent to the one end portion of the power transmission shaft and then to the inside of the bowl-shaped portion, the oil passages being in the form of grooves formed in an outer surface of the tubular portion and extending in the direction of an axial center line of the power transmission shaft.

* * * * *